J. C. WRIGHT.
NUT-LOCK.

No. 189,984. Patented April 24, 1877.

UNITED STATES PATENT OFFICE.

JOSEPH C. WRIGHT, OF PHILADELPHIA, PENNSYLVANIA.

IMPROVEMENT IN NUT-LOCKS.

Specification forming part of Letters Patent No. 189,984, dated April 24, 1877; application filed March 3, 1877.

*To all whom it may concern:*

Figure 1:
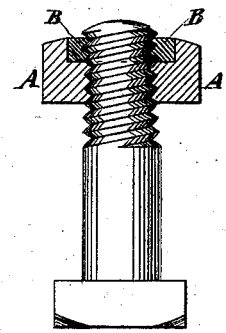
Figure 2:
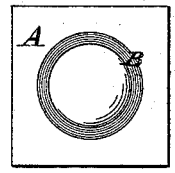

Be it known that I, JOSEPH C. WRIGHT, of Philadelphia, in the county of Philadelphia and State of Pennsylvania, have invented a new and Improved Nut-Lock, of which the following is a specification:

The object of this invention is to construct a nut in such manner that it may be rigidly held on its bolt, when set in position, by inserting a packing of soft metal or other material capable of expansion, into a recess cut, punched, or swaged in the face of the nut in such manner that the packing may have a direct bearing on the thread of the bolt, the construction and operation of my invention being described as follows:

Figure 1 represents a sectional view showing my invention. Fig. 2 is a plan of the same.

Similar letters of reference indicate corresponding parts.

In the case here presented, A represents a nut having a recess, B, cut, punched, or swaged such depth as desired. The said nut having been placed on its bolt and turned up tightly in position, a packing of soft metal, such as lead, copper, brass, or their equivalent, is set in the recess B and tamped tightly thereon by striking with a hammer and punch, or other tool provided for such purpose.

It will here be observed that the soft metal thus driven in the recess is made to swell out, so as to form a rigid packing between the nut and its bolt, which binds them so tightly together that it will not shake loose, and, furthermore, when it becomes necessary to remove the nut it can be done by applying a wrench, in which case the bolt-thread will cut its way through the soft metal.

It will further be observed that when the nut is removed the same packing can be used repeatedly, by simply compressing it when put on the bolt with the aid of a hammer and punch, as before.

I am aware that it is not new to pass a metal key through a longitudinal slot in bolt, the same to be upset after the nut is screwed on; but

What I claim is—

The combination of a nut having annular recess in upper face communicating with taphole, a screw-bolt, and an annular tamped packing of soft metal, substantially as and for the purpose specified.

JOSEPH C. WRIGHT.

Witnesses:
CHARLES H. NASH,
ALEX. F. ROBERTS.